US011908643B2

(12) United States Patent
Zhou et al.

(10) Patent No.: US 11,908,643 B2
(45) Date of Patent: Feb. 20, 2024

(54) SPRING MECHANISM USED FOR DUAL POWER TRANSFER SWITCH AND DUAL POWER TRANSFER SWITCH

(71) Applicant: Schneider Electric Industries SAS, Rueil-Malmaison (FR)

(72) Inventors: Junjie Zhou, Shanghai (CN); Xi Xie, Shanghai (CN); Xiaoqin Wang, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/726,764

(22) Filed: Apr. 22, 2022

(65) Prior Publication Data

US 2022/0344111 A1 Oct. 27, 2022

(30) Foreign Application Priority Data

Apr. 23, 2021 (CN) ......................... 202120847713.7

(51) Int. Cl.
*H01H 3/38* (2006.01)
*H01H 9/02* (2006.01)

(52) U.S. Cl.
CPC ................ *H01H 3/38* (2013.01); *H01H 9/02* (2013.01)

(58) Field of Classification Search
CPC ............ H01H 3/38; H01H 9/02; H01H 71/08; H01H 71/02; H01H 71/12; H01H 9/16; H01H 71/04; H01H 2071/042; H01H 2235/01; H01H 2235/018
USPC .......................................................... 200/293
See application file for complete search history.

(56) References Cited

FOREIGN PATENT DOCUMENTS

| | | | | |
|---|---|---|---|---|
| CN | 210040102 * | 2/2020 | | H01H 71/02 |
| CN | 210040102 U | 2/2020 | | |
| EP | 3799088 A1 * | 3/2021 | | H01H 9/16 |
| EP | 3799088 A1 | 3/2021 | | |

OTHER PUBLICATIONS

Extended European Search Report dated Sep. 9, 2022 for corresponding European Patent Application No. 22305600.3-1201, 7 pages.
Indian Office Action dated Nov. 1, 2022 for corresponding Indian Patent Application No. 202244023750, 5 pages.

* cited by examiner

*Primary Examiner* — Edwin A. Leon
*Assistant Examiner* — Iman Malakooti
(74) *Attorney, Agent, or Firm* — Locke Lord LLP

(57) ABSTRACT

The application relates to a spring mechanism for a dual power transfer switch and a dual power transfer switch. The spring mechanism includes: a base mounted on a housing of the dual power transfer switch; and a spring mounted on the base. The spring includes a first leg configured to contact and exert a pressure on an indicator of the dual power transfer switch, so as to generate a frictional force between the first leg and the indicator and reduce a rebound of the indicator upon the indicator moving between a first indicating position and an intermediate indicating position, the first indicating position indicates that the dual power transfer switch is in a first power-on position, and the intermediate indicating position indicates that the dual power transfer switch is in a dual-off position.

4 Claims, 5 Drawing Sheets

SPRING MECHANISM USED FOR DUAL POWER TRANSFER SWITCH AND DUAL POWER TRANSFER SWITCH

TECHNICAL FIELD

The application relates to a spring mechanism for a dual power transfer switch and a dual power transfer switch.

BACKGROUND

An indicator of a dual power transfer switch is used to indicate whether the dual power transfer switch is in a first power-on position, a dual-off position or a second power-on position. Generally speaking, with a movement of an indicator driving rod of the dual power transfer switch, the indicator moves between a first indicating position corresponding to the first power-on position, an intermediate indicating position corresponding to the dual-off position and a second indicating position corresponding to the second power-on position.

In the existing mechanical indicator, there are the following problems:

First, because the dimensional tolerance is difficult to accurately control, the tolerance of the indicated position on the dimension chain is too large to meet the requirements;

Second, due to the impact of the indicator, the indicator will rebound many times, so the final fixed position can never be determined. Only after the energy is released, the final fixed position can be determined, so the position is random;

Third, the force of the long indicator driving rod is unbalanced, which leads to its own movement tilt, which makes the mechanical indication worse.

SUMMARY

Therefore, the application provides a spring mechanism for a dual power transfer switch, which includes a base mounted on a housing of the dual power transfer switch and a spring mounted on the base; the spring includes a first leg configured to contact and exert a pressure on an indicator of the dual power transfer switch, so as to generate a frictional force between the first leg and the indicator and reduce a rebound of the indicator upon the indicator moving between a first indicating position and an intermediate indicating position, the first indicating position indicates that the dual power transfer switch is in a first power-on position, and the intermediate indicating position indicates that the dual power transfer switch is in a dual-off position.

Advantageously, upon the dual power transfer switch being switched from the dual-off position to the first power-on position, the indicator moves from the intermediate indicating position to the first indicating position, and upon the indicator moving to the first indicating position, the first leg is in contact with a first lateral portion of the indicator, so that the pressure exerted by the first leg on the indicator includes a first horizontal component and a first vertical component, and the first horizontal component is oriented to push the indicator toward the first indicating position, so as to further prevent the rebound of the indicator.

Advantageously, the spring mechanism further includes a first groove for accommodating the first leg of the spring, and a size of the first groove is set to match a diameter of the first leg, so that the first leg is allowed to move only in a depth direction of the first groove.

Advantageously, the spring further includes a second leg configured to contact and exert a pressure on the indicator of the dual power transfer switch, so as to generate a frictional force between the second leg and the indicator and reduce the rebound of the indicator upon the indicator moving between a second indicating position and the intermediate indicating position, and the second indicating position indicates that the dual power transfer switch is in a second power-on position.

Advantageously, upon the dual power transfer switch being switched from the dual-off position to the second power-on position, the indicator moves from the intermediate indicating position to the second indicating position, and upon the indicator moving to the second indicating position, the second leg is in contact with a second lateral portion of the indicator, so that the pressure exerted by the second leg on the indicator includes a second horizontal component and a second vertical component, and the second horizontal component is oriented to push the indicator toward the second indicating position so as to further prevent the rebound of the indicator.

Advantageously, the spring mechanism further includes a second groove for accommodating the second leg of the spring, and a size of the second groove is set to match a diameter of the second leg, so that the second leg is allowed to move only in a depth direction of the second groove.

Advantageously, the spring mechanism further includes a fixing component, and the fixing component fixes the spring mechanism on the housing of the dual power transfer switch.

Advantageously, the base is integrated with the housing of the dual power transfer switch.

The application further provides a dual power transfer switch, which includes the above-mentioned spring mechanism.

BRIEF DESCRIPTION OF THE DRAWINGS

The advantages and objectives of the application can be better understood in the following preferred embodiments of the application described in detail with the accompanying drawings. In order to better show the relationship of the components in the drawings, the drawings are not drawn to scale. In the accompanying drawings.

DETAILED DESCRIPTION

Figure 1:
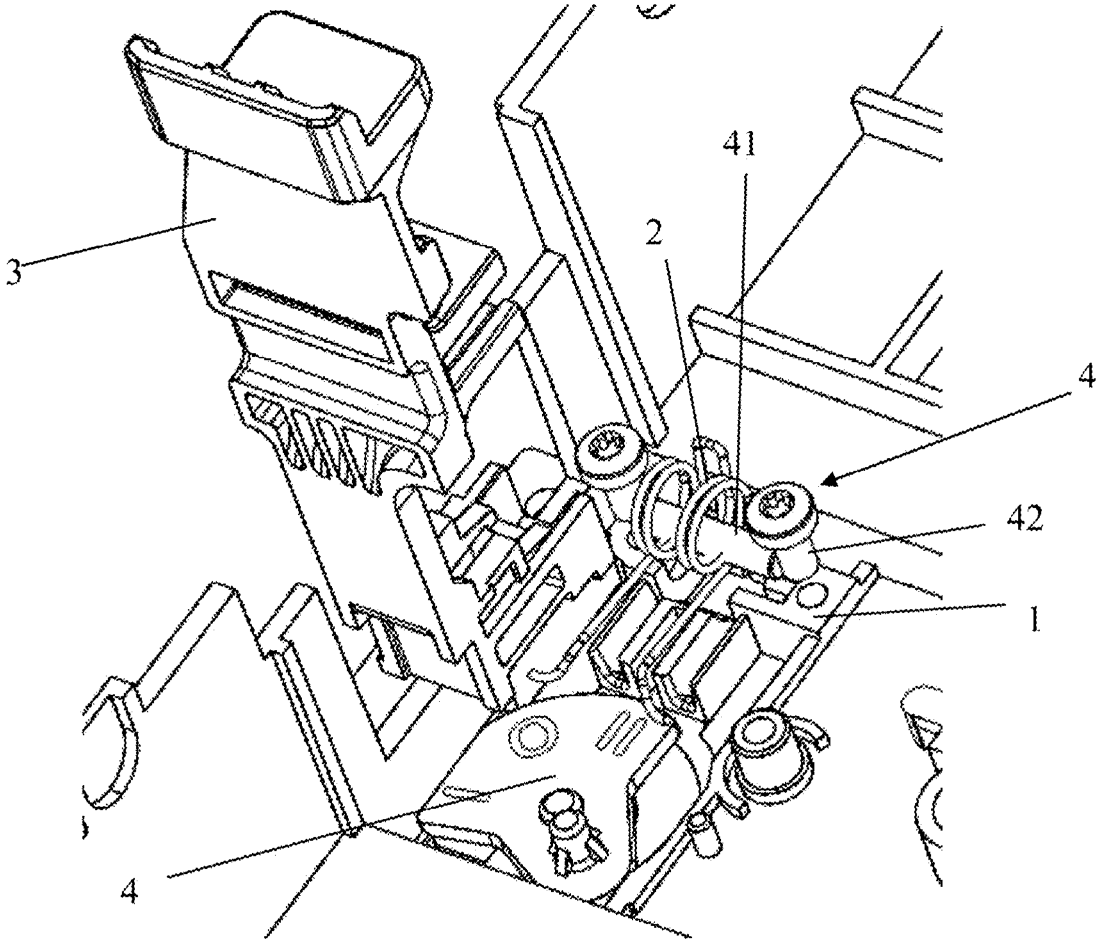
FIG. 1 shows an exploded view of s spring mechanism according to the application, and also shows an indicator driving rod.
Figure 2:
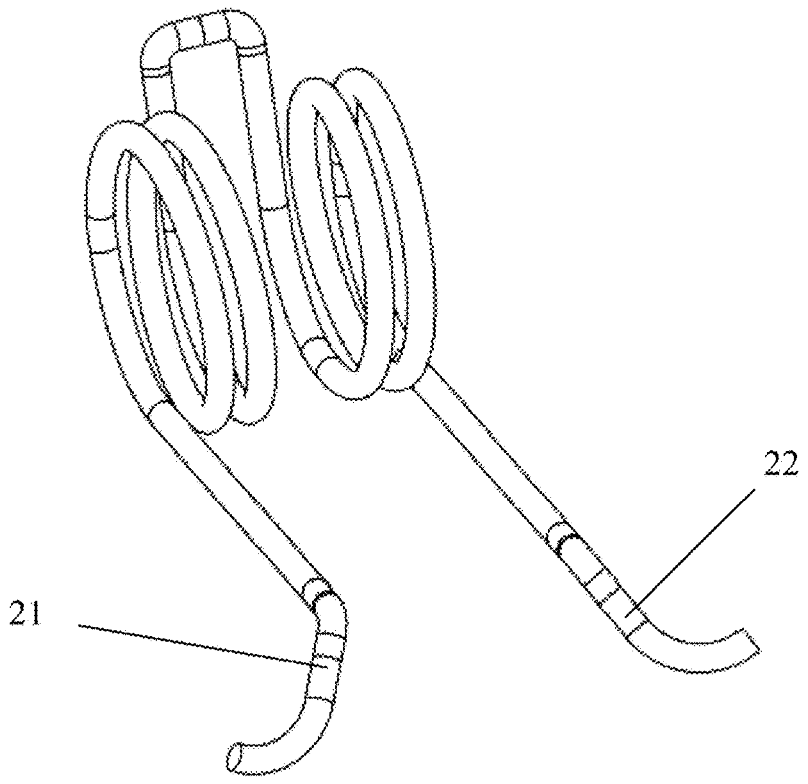
FIG. 2 shows a schematic diagram of a spring of a spring mechanism according to the application.

Various embodiments according to the application will be described in detail with reference to the drawings. Herein, it should be noted that, in the drawings, the same reference numerals are given to components that basically have the same or similar structures and functions, and repeated descriptions about them will be omitted. The term "including A, B, C, etc. in turn" only indicates the arrangement order of included components A, B, C, etc., and does not exclude the possibility of including other components between A and B and/or between B and C.

The drawings in this specification are schematic diagrams, which assist in explaining the conception of the application and schematically show the shapes of various parts and their relationships.

Hereinafter, referring to FIGS. 1 to 8, the preferred embodiments of the application are described in detail.

Figure 6:
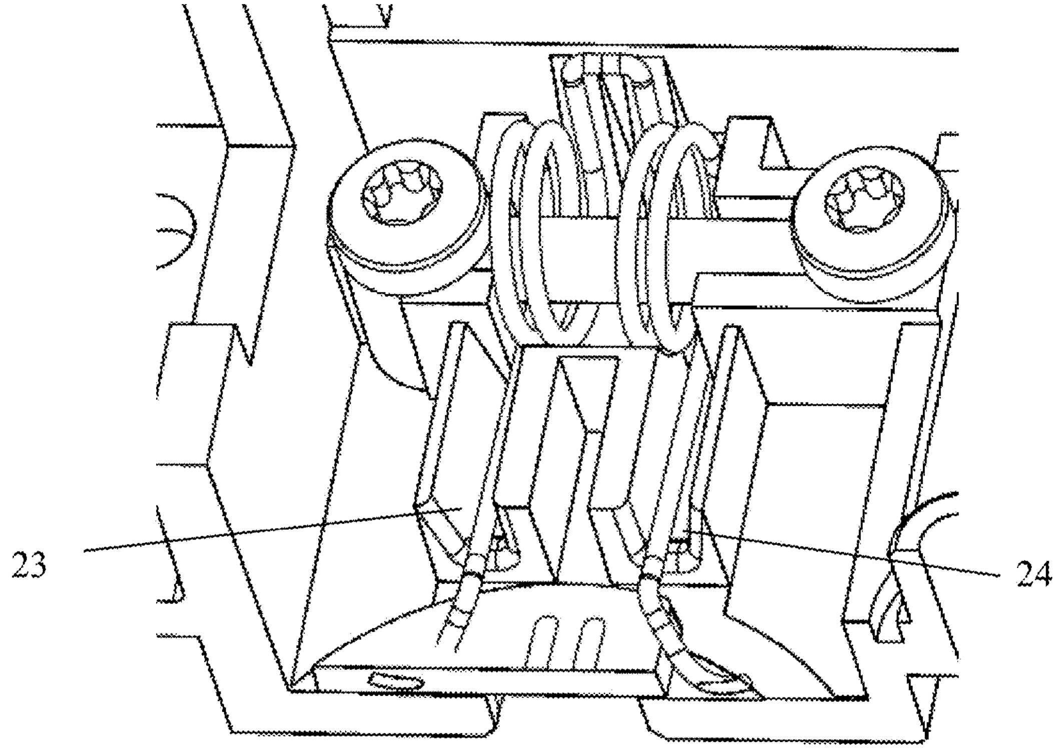
FIG. 6 shows an enlarged view of a first leg and a second leg of the spring in a first groove and a second groove respectively.
Figure 8:
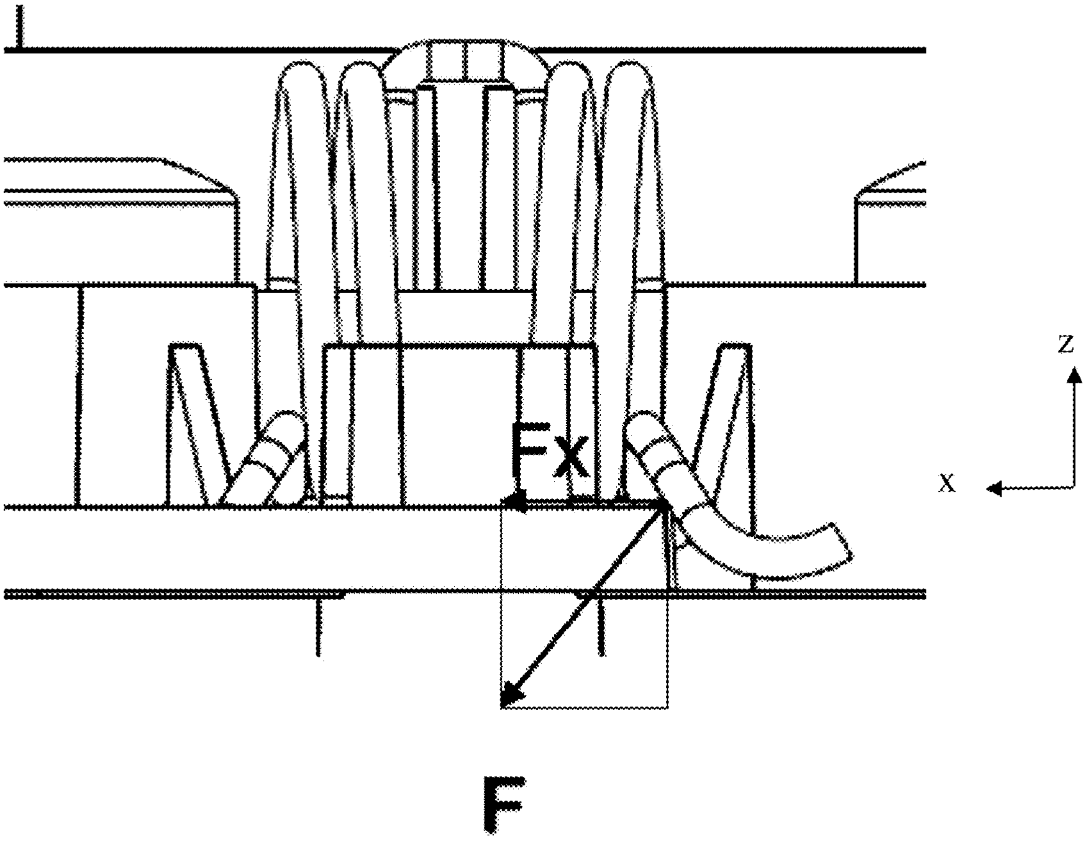
FIG. 8 shows another perspective view of a second leg contacting a second lateral portion of the indicator in a second indicating position of the indicator.

FIG. 1 shows an exploded view of a spring mechanism according to the application. The spring mechanism includes a base 1, which is mounted on a housing of the dual power transfer switch, and is preferably formed integrally with the housing; a spring 2 mounted on the base and including a first leg 21 and a second leg 22; a first groove 23 (as shown in FIG. 6) configured for accommodating the first leg 21, and dimensioned to match a diameter of the first leg, that is, the first groove allows the first leg to move only in a depth direction of the first groove (z axis direction as shown in FIG. 8), but not in the x axis direction, so that the positioning of the indicator is more stable; a second groove 24 configured for accommodating the second leg 22. Similar to the first groove 23, a size of the second groove 24 is designed to match a diameter of the second leg, that is, the second groove allows the second leg to move only in a depth direction of the second groove (z axis direction as shown in FIG. 8) but not in the x axis direction, thus making the positioning of the indicator more stable. The spring mechanism further includes a fixing component 4 that fixes the spring mechanism to the housing of the dual power transfer switch. As shown in FIG. 1, the fixing component 4 includes a pin 41 and a screw 42. The pin 41 passes through the spring and is accommodated in the base. Preferably, two screws 42 are screwed through the screw holes in the base and fixed to the housing of the dual power transfer switch.

Figure 3:
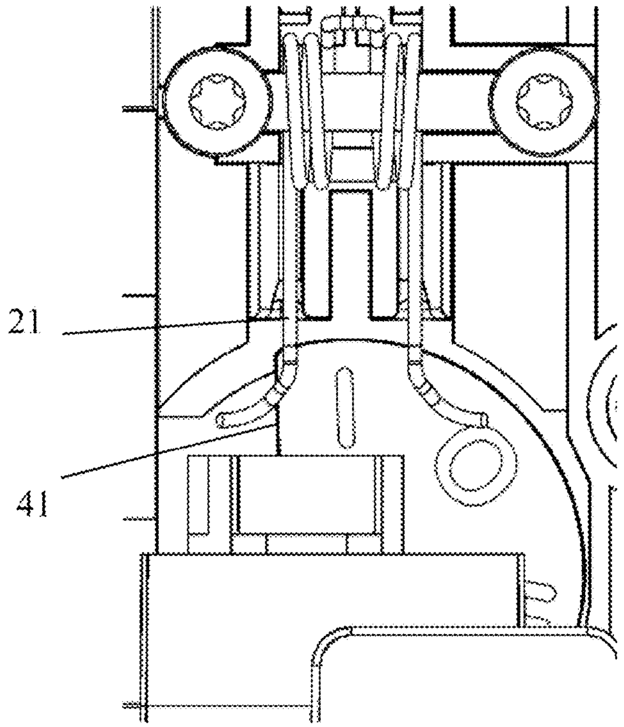
FIG. 3 shows a bottom view of an indicator in a first indicating position.
Figure 4:
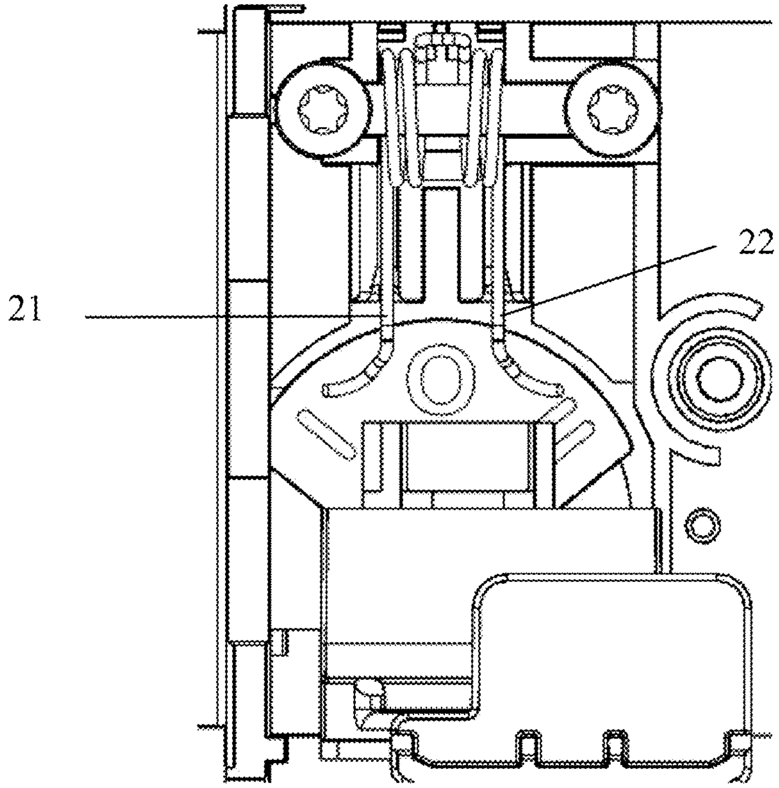
FIG. 4 shows a bottom view of an indicator in an intermediate indicating position.

Upon the dual power transfer switch being switched from the dual-off position to the first power-on position, driven by the indicator driving rod 3, the indicator 4 moves from the intermediate indicating position (as shown in FIG. 4) to the first indicating position (as shown in FIG. 3). In this process, the first leg is contact with a surface of the indicator and exerts a pressure on the indicator, thus generating a frictional force between the first leg and the indicator, which helps to reduce the rebound of the indicator in this process. Advantageously, in this process, the second leg is also in contact with a surface of the indicator and exerts a pressure on the indicator, thus generating a frictional force between the second leg and the indicator, which helps to reduce the rebound of the indicator in this process. After the indicator reaches the first indication position, the first leg will contact a first lateral portion 41 of the indicator, so that the pressure exerted on the indicator includes a first horizontal component and a first vertical component, and the first horizontal component pushes the indicator toward the first indication position, thereby further reducing the rebound of the indicator and ensuring that the indicator accurately reaches the first indication position. The way in which the indicator driving rod 3 drives the indicator 4 to move is well known to those skilled in the art, and the repeated portions are omitted herein.

Figure 5:
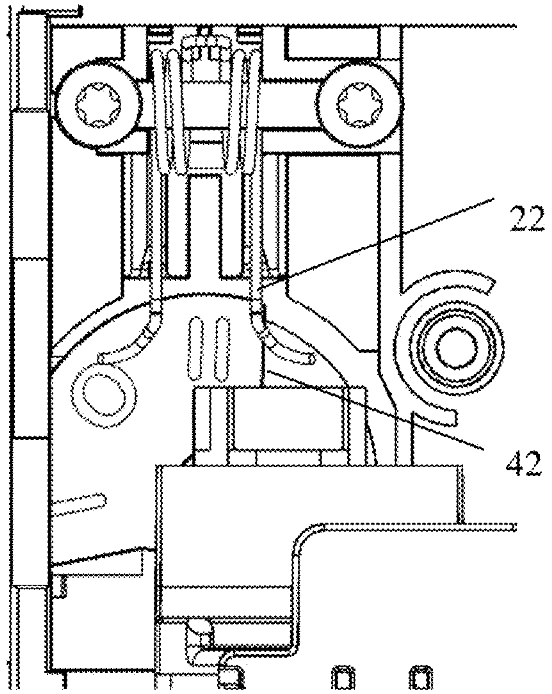
FIG. 5 shows a bottom view of an indicator in a second indicating position.
Figure 7:
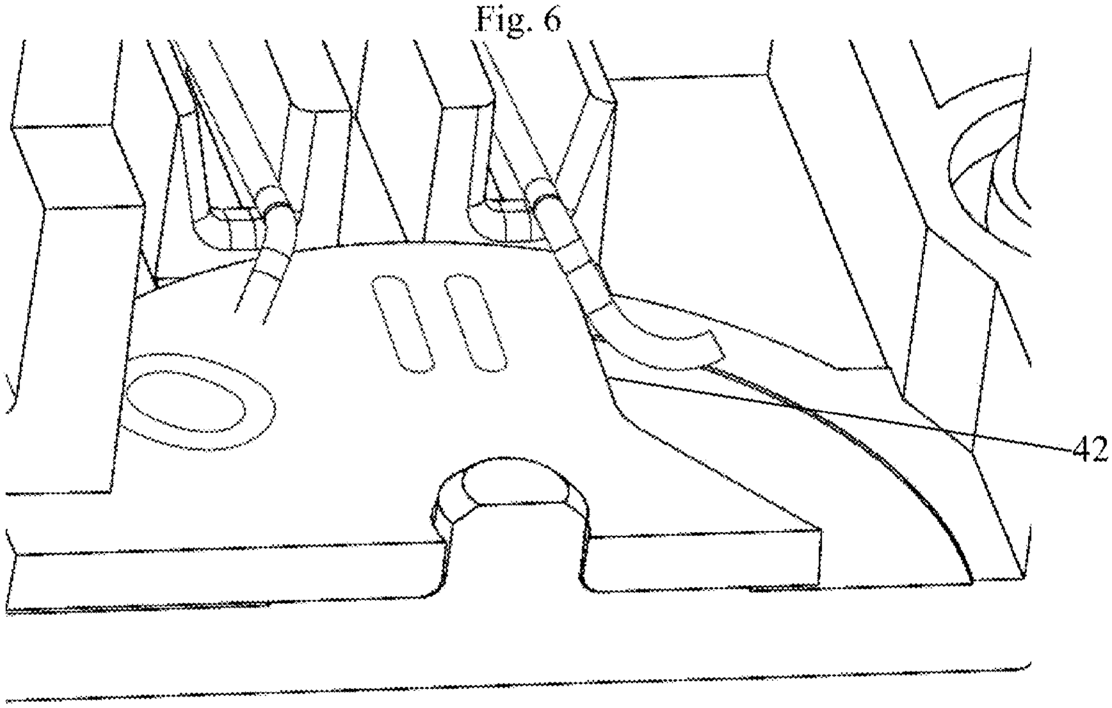
FIG. 7 shows a perspective view of a second leg contacting a second lateral portion of an indicator in a second indicating position of the indicator.

Upon the dual power transfer switch being switched from the dual-off position to the second power-on position, driven by the indicator driving rod 3, the indicator 4 moves from the intermediate indicating position (as shown in FIG. 4) to the second indicating position (as shown in FIG. 5). In this process, the second leg is in contact with the surface of the indicator and exerts a pressure to the indicator, thus generating a frictional force between the second leg and the indicator, which helps to reduce the rebound of the indicator in this process. Advantageously, in this process, the first leg is also in contact with the surface of the indicator and exerts a pressure on the indicator, thus generating a frictional force between the first leg and the indicator, which helps to reduce the rebound of the indicator in this process. After the indicator reaches the second indicating position, the second leg will contact a second lateral portion 42 of the indicator (as shown in FIG. 7), so that the pressure exerted on the indicator includes a second horizontal component Fx and a second vertical component (as shown in FIG. 8), and the second horizontal component pushes the indicator toward the second indicating position, thereby further reducing the rebound of the indicator and ensuring that the indicator accurately reaches the second indicating position.

The spring mechanism according to the application is introduced above. Through the spring mechanism, the first leg and the second leg of the spring always keep in contact with the indicator, providing a certain friction force and reducing the rebound of the indicator. Especially, in the first indicating position and the second indicating position, the first leg and the second leg will contact with the first lateral portion and the second lateral portion of the indicator respectively, providing a lateral pressure, which has horizontal component and vertical component, and the horizontal component helps the indicator to reach the correct indicating position, while also reducing the rebound of the indicator. Due to the friction force, the indicator will move closer to an upper surface of the housing of the dual power transfer switch, which reduces the dust entry, makes the movement more stable, and also reduces the movement inclination of the indicator driving rod.

The above description is only an explanation of the application, so that ordinary skilled in the art can implement the scheme completely, but it is not a limitation to the application. The above disclosed technical features are not limited to the disclosed combination with other features, and those skilled in the art can also make other combinations among the technical features according to the purpose of the application, so as to realize the purpose of the application.

The invention claimed is:

1. A dual power transfer switch comprising a spring mechanism, which is characterized by comprising:

a base, mounted on a housing of the dual power transfer switch;

a spring, mounted on the base, wherein the spring comprises a first leg configured to contact and exert a pressure on an indicator of the dual power transfer switch, so as to generate a frictional force between the first leg and the indicator and reduce a rebound of the indicator upon the indicator moving between a first indicating position and an intermediate indicating position, wherein the first indicating position indicates that the dual power transfer switch is in a first power-on position, and the intermediate indicating position indicates that the dual power transfer switch is in a dual-off position, upon the dual power transfer switch being switched from the dual-off position to the first power-on position, the indicator moves from the intermediate indicating position to the first indicating position, and upon the indicator moving to the first indicating position, the first leg is in contact with a first lateral portion of the indicator, so that the pressure exerted by the first leg on the indicator comprises a first horizontal component and a first vertical component, and the first horizontal component is oriented to push the indicator toward the first indicating position, so as to further prevent the rebound of the indicator, the spring mechanism further comprises a first groove for accommodating the first leg of the spring, and a size of the first groove is designed to match a diameter of the first leg, so that the first leg is allowed to move only in a depth direction of the first groove, the spring further comprises a second leg configured to contact and exert a pressure on the indicator of the dual power transfer switch, so as to generate a frictional force between the second leg and the indicator and reduce the rebound of the indicator upon the indicator moving between a second indicating position and the intermediate indicating position, and the second indicating position indicates that the dual power transfer switch is in a second power-on position, upon the dual power transfer switch being switched from the dual-off position to the second power-on position, the indicator moves from the intermediate indicating position to the second indicating position, and upon the indicator moving to the second indicating position, the second leg is in contact with a second lateral portion of the indicator, so that the pressure exerted by the second leg on the indicator comprises a second horizontal component and a second vertical component, and the second horizontal component is oriented to push the indicator toward the second indicating position so as to further prevent the rebound of the indicator.

2. The dual power transfer switch according to claim 1, which is characterized in that, the spring mechanism further comprises a second groove for accommodating the second leg of the spring, and a size of the second groove is designed to match a diameter of the second leg, so that the second leg is allowed to move only in a depth direction of the second groove.

3. The dual power transfer switch according to claim 1, which is characterized in that, the spring mechanism further comprises a fixing component, and the fixing component fixes the spring mechanism on the housing of the dual power transfer switch.

4. The dual power transfer switch according to claim 1, which is characterized in that, the base is integrated with the housing of the dual power transfer switch.

* * * * *